(12) United States Patent
McCarthy

(10) Patent No.: US 12,045,180 B2
(45) Date of Patent: Jul. 23, 2024

(54) SYSTEM OPERATIONS CONTROLLER

(71) Applicant: Dell Products L.P., Round Rock, TX (US)

(72) Inventor: Jason McCarthy, Cambridge, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/862,705

(22) Filed: Jul. 12, 2022

(65) Prior Publication Data

US 2024/0020251 A1 Jan. 18, 2024

(51) Int. Cl.
*G06F 13/20* (2006.01)
(52) U.S. Cl.
CPC .......... *G06F 13/20* (2013.01); *G06F 2213/40* (2013.01)
(58) Field of Classification Search
CPC ............................ G06F 12/0223; H04L 67/568
See application file for complete search history.

(56) References Cited

U.S. PATENT DOCUMENTS

| | | | | |
|---|---|---|---|---|
| 2016/0147631 | A1* | 5/2016 | Magdon-Ismail | H04L 67/568 718/100 |
| 2019/0370084 | A1* | 12/2019 | Behar | G06N 3/044 |
| 2021/0173782 | A1* | 6/2021 | Krasner | G06F 12/0223 |
| 2022/0091761 | A1* | 3/2022 | Patel | G06F 3/0605 |
| 2022/0321403 | A1* | 10/2022 | Enrici | H04L 41/0896 |
| 2022/0400085 | A1* | 12/2022 | Ananthanarayanan | G06F 9/505 |

* cited by examiner

*Primary Examiner* — Getente A Yimer
(74) *Attorney, Agent, or Firm* — Krishnendu Gupta; Nikhil Patel

(57) ABSTRACT

One or more aspects of the present disclosure relate to managing system operations. For example, in embodiments, an input/output (IO) workload can be received by a storage array. Further, one or more array-related operations can be initiated during one or more low IO load points the system workload places on the storage array.

16 Claims, 5 Drawing Sheets

SYSTEM OPERATIONS CONTROLLER

BACKGROUND

A storage array is a data storage system for block-based storage, file-based storage, or object storage. Rather than store data on a server, storage arrays can include multiple storage devices (e.g., drives) to store vast amounts of data. In addition, storage arrays can include a central management system that manages the data and delivers one or more distributed storage services for an organization. For example, a financial institution can use storage arrays to collect and store financial transactions from local banks (e.g., bank account deposits/withdrawals). Additionally, the financial institution can use the storage array to collect information related to loan transactions (e.g., mortgages). Accordingly, the storage array can provide the financial institution with many services unique to each transaction type.

SUMMARY

One or more aspects of the present disclosure relate to managing system operations. In embodiments, an aspect includes a method comprising receiving a system workload at a storage array and initiating one or more array-related operations based on an input/output (IO) load the system workload places on the storage array.

In embodiments, the method can also include analyzing the system workload and its corresponding input/output (IO) requests. Further, the method can include measuring network-related metrics related to receiving the system workload and its corresponding IO requests and calculating array-related performance metrics relating to receiving and processing the system workload and its corresponding IO requests based on the network-related metrics and the system workload analysis.

In embodiments, the method can also include generating an array-related operations model defining a schedule for performing the one or more array-related operations based on the one or more IO load models and initiating the one or more array-related operations based on the array-related operations model.

In embodiments, the method can also include identifying one or more patterns corresponding to the system workload and corresponding IO requests based on the system workload analysis, network-related metrics, and array-related performance metrics.

In embodiments, the method can also include generating one or more system workload models based on the system workload analysis, historical, current, and anticipated array-related performance metrics, and historical, current, and anticipated network-related metric measurements.

In embodiments, the method can also include determining a system workload shape of the system workload and its corresponding IO requests based on one or more system workload models.

In embodiments, the method can also include defining a global data collection period corresponding to statistically relevant data sets. For example, the statistically relevant data sets can include the system workload and correspond IO requests analysis, network-related metric measurements, and array-related performance metric calculations. Additionally, the method can include defining a data collection size based on the global data collection period.

In embodiments, the method can also include defining a data collection sampling window based on the global data collection period and the data collection size, collecting data samples during each sampling window, and segmenting the data samples into buckets based on temporal relationships between one or more of the data samples.

In embodiments, the method can also include measuring the storage array's load during one or more points on the system workload shape of the system workload, determining a load growth factor for each of the one or more points based on at least the array-related performance metrics, and correlating each point's load and load growth factor with each system workload model and system workload shape of the system workload.

In embodiments, the method can also include determining the duration and frequency of each array-related operation. Further, the method can also include generating one or more IO load models defining periods corresponding to one or more points on the system workload shape. For example, the points can correspond to locations where the load growth factor exceeds a threshold growth factor or the low IO load points fall below an IO load threshold.

In embodiments, the method can also include generating an array-related operations model defining a schedule for performing one or more array-related operations. For example, the schedule can be generated based on one or more IO load models. Further, the method can include initiating the array-related operations based on the array-related operations model.

In embodiments, another aspect includes an apparatus comprising a memory and processor. The apparatus is configured to receive a system workload at a storage array and initiate one or more array-related operations based on an input/output (IO) load the system workload places on the storage array.

In embodiments, the apparatus can also be configured to analyze the system workload, and each of its corresponding input/output (IO) requests. Further, the apparatus can measure network-related metrics related to receiving the system workload and its corresponding IO requests. Additionally, the apparatus can calculate array-related performance metrics for receiving and processing the system workload and its corresponding IO requests based on the network-related metrics and the system workload analysis.

In embodiments, the apparatus can generate an array-related operations model. The array-related operations model can define a schedule for performing one or more array-related operations based on the one or more IO load models. Additionally, the apparatus can initiate one or more array-related operations based on the array-related operations model.

In embodiments, the apparatus can also be configured to identify one or more patterns corresponding to the system workload and its corresponding IO requests based on the system workload analysis, network-related metrics, and array-related performance metrics.

In embodiments, the apparatus can generate one or more system workload models based on the system workload analysis, historical, current, and anticipated array-related performance metrics, and historical, current, and anticipated network-related metric measurements.

In embodiments, the apparatus can also be configured to determine a system workload shape of the system workload and its corresponding IO requests based on one or more system workload models.

In embodiments, the apparatus can also be configured to define a global data collection period corresponding to statistically relevant data sets for the system workload and corresponding IO requests analysis, network-related metric measurements, and array-related performance metric calculations, and define a data collection size based on the global data collection period.

In embodiments, the apparatus can also be configured to define a data collection sampling window based on the global data collection period and the data collection size, collect data samples during each data collection sampling window and segment the data samples into buckets based on temporal relationships between one or more of the data samples.

In embodiments, the apparatus can also be configured to measure the storage array's load during one or more points on the system workload shape of the system workload, determine a load growth factor for each of the one or more points based on at least the array-related performance metrics, and correlate each point's load and load growth factor with each system workload model and system workload shape of the system workload.

In embodiments, the apparatus can also be configured to determine one or more of the duration and frequency for each array-related operation. Additionally, the apparatus can generate one or more IO load models defining periods corresponding to points where the load growth factor exceeds a threshold growth factor or the low IO load points fall below an IO load threshold.

Other technical features may be readily apparent to one skilled in the art from the following figures, descriptions, and claims.

DETAILED DESCRIPTION

An organization can deliver its customers several business functions (e.g., customer-facing services) that require distributed access to data/information. Additionally, the organization's employees can require shared access to the data/information. Therefore, the organization can use a storage array to provide distributed data/information required to perform its business functions. Specifically, a storage array can include multiple devices that store vast amounts of data. Additionally, a storage array can include a management system that manages its memory, storage devices, processing resources (e.g., processors), data, and the like to deliver data/information for its business services.

For example, a financial institution can use storage arrays to store banking account information, deposits, withdrawals, loan information, and other related data. Specifically, a bank can use storage arrays to deliver customer-facing services such as checking account services (e.g., fund deposits and withdrawals). For example, the checking account service can use the storage array to retrieve and present account holders with their account balances. Further, a banking employee, e.g., an IT administrator, can access the checking account services to perform IT-related tasks. Accordingly, the storage array can initiate distinct backend operations in response to receiving data/service access requests from account holders or banking employees in addition to one or more self-servicing or maintenance operations like software and firmware updates. However, such operations can divert resources away from processing customer-related operations.

As described in greater detail herein, embodiments of the present disclosure include hardware, circuitry, and logic that enable smart and dynamic management of array operations and corresponding resource allocations. Advantageously, the embodiments can prevent interference between certain array operations and enhance a storage array's performance capabilities (e.g., response times).

Figure 1:
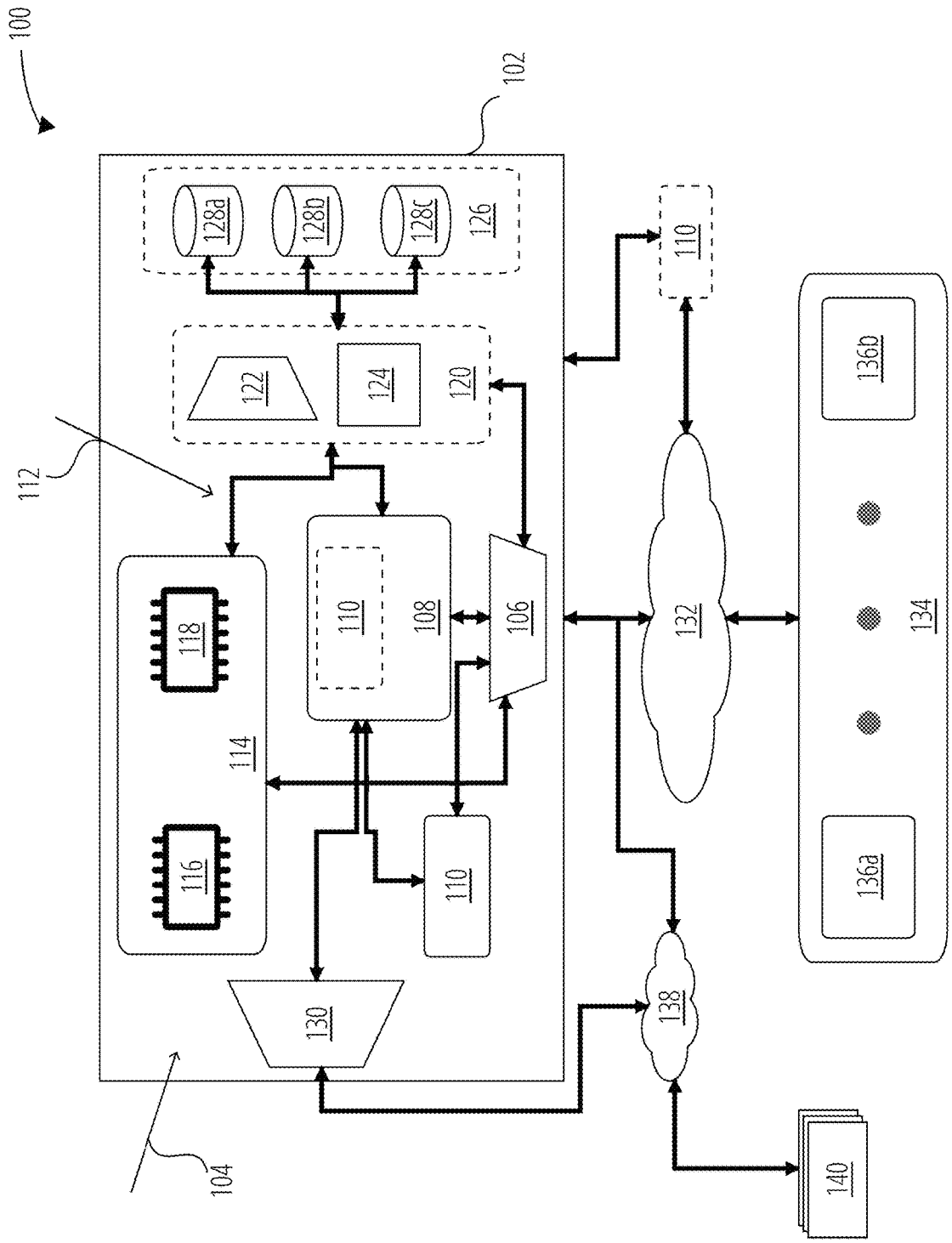
FIG. 1 illustrates a distributed network environment that includes a storage array per embodiments of the present disclosure.

Regarding FIG. 1, a distributed network environment 100 can include a storage array 102, a remote system 140, and hosts 134. In embodiments, the storage array 102 can include components 104 that perform one or more distributed file storage services. In addition, the storage array 102 can include one or more internal communication channels 112 like Fibre channels, busses, and communication modules that communicatively couple the components 104.

In embodiments, the storage array 102, components 104, and remote system 140 can include a variety of proprietary or commercially available single or multi-processor systems (e.g., parallel processor systems). The single or multi-processor systems can include central processing units (CPUs), graphical processing units (GPUs), and the like. Additionally, the storage array 102, remote system 140, and hosts 134 can virtualize one or more of their respective physical computing resources (e.g., processors (not shown), memory 114, and storage devices 126).

In embodiments, the storage array 102 and, e.g., one or more hosts 134 (e.g., networked devices) can establish a network 132. Similarly, the storage array 102 and a remote system 140 can establish a remote network (RN 138). Further, the network 132 or the RN 138 can have a network architecture that enables networked devices to send/receive electronic communications using a communications protocol. For example, the network architecture can define a storage area network (SAN), local area network (LAN), wide area network (WAN) (e.g., the Internet), and Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 132 or RN 138 using one or more network interfaces. The network interface can include a wired/wireless connection, bus, data link, and the like. For example, a host adapter (HA) 106, e.g., a Fibre Channel Adapter (FA) and the like, can connect the storage array 102 to the network 132 (e.g., SAN). Likewise, a remote adapter (RA) 130 can also connect the storage array 102 to the RN 138. Further, the network 132 and RN 138 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 132 or RN 138 can include a network bridge that enables cross-network communications between, e.g., the network 132 and RN 138.

In embodiments, hosts 134 connected to the network 132 can include client machines 136a-136b, running one or more applications. The applications can require one or more of the storage array's services. Accordingly, each application can send one or more input/output (IO) messages (e.g., a read/write request or other storage service-related request) to the storage array 102 over the network 132. Further, the IO messages can include metadata defining performance requirements according to a service level agreement (SLA) between hosts 134 and the storage array provider.

In embodiments, the storage array 102 can include a memory 114 such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 116) that can cache IO messages and their respective data payloads. Additionally, the memory 114 can include local memory (LM 118) that stores instructions that the storage array's processor(s) can execute to perform one or more storage-related services. In addition, the storage array 102 can deliver its distributed storage services using storage devices 126. For example, the storage devices 126 can include multiple thin-data devices (TDATs) such as persistent storage devices 128a-128c. Further, each TDAT can have distinct performance capabilities (e.g., read/write speeds) like hard disk drives (HDDs) and solid-state drives (SSDs).

In embodiments, the storage array 102 can include an Enginuity Data Services processor (EDS) 108 that performs one or more memory and storage self-optimizing operations (e.g., one or more machine learning techniques). Specifically, the operations can implement techniques that deliver performance, resource availability, data integrity services, and the like based on the SLA and the performance characteristics (e.g., read/write times) of the array's memory 114 and storage devices 126. For example, the EDS 108 can deliver hosts 134 (e.g., client machines 136a-136b) remote/distributed storage services by virtualizing the storage array's memory/storage resources (memory 114 and storage devices 126, respectively).

In embodiments, the storage array 102 can also include a controller 110 (e.g., management system controller) that can reside externally from or within the storage array 102 and one or more of its component 104. When external from the storage array 102, the controller 110 can communicate with the storage array 102 using any known communication connections. The communications connections can include a serial port, parallel port, network interface card (e.g., Ethernet), etc. Further, the controller 110 can include logic/circuitry that performs one or more storage-related services. For example, the controller 110 can have an architecture designed to manage the storage array's computing, storage, and memory resources. Further, the controller 110 can perform smart operations scheduling and resource allocation techniques described in greater detail herein.

Figure 2:
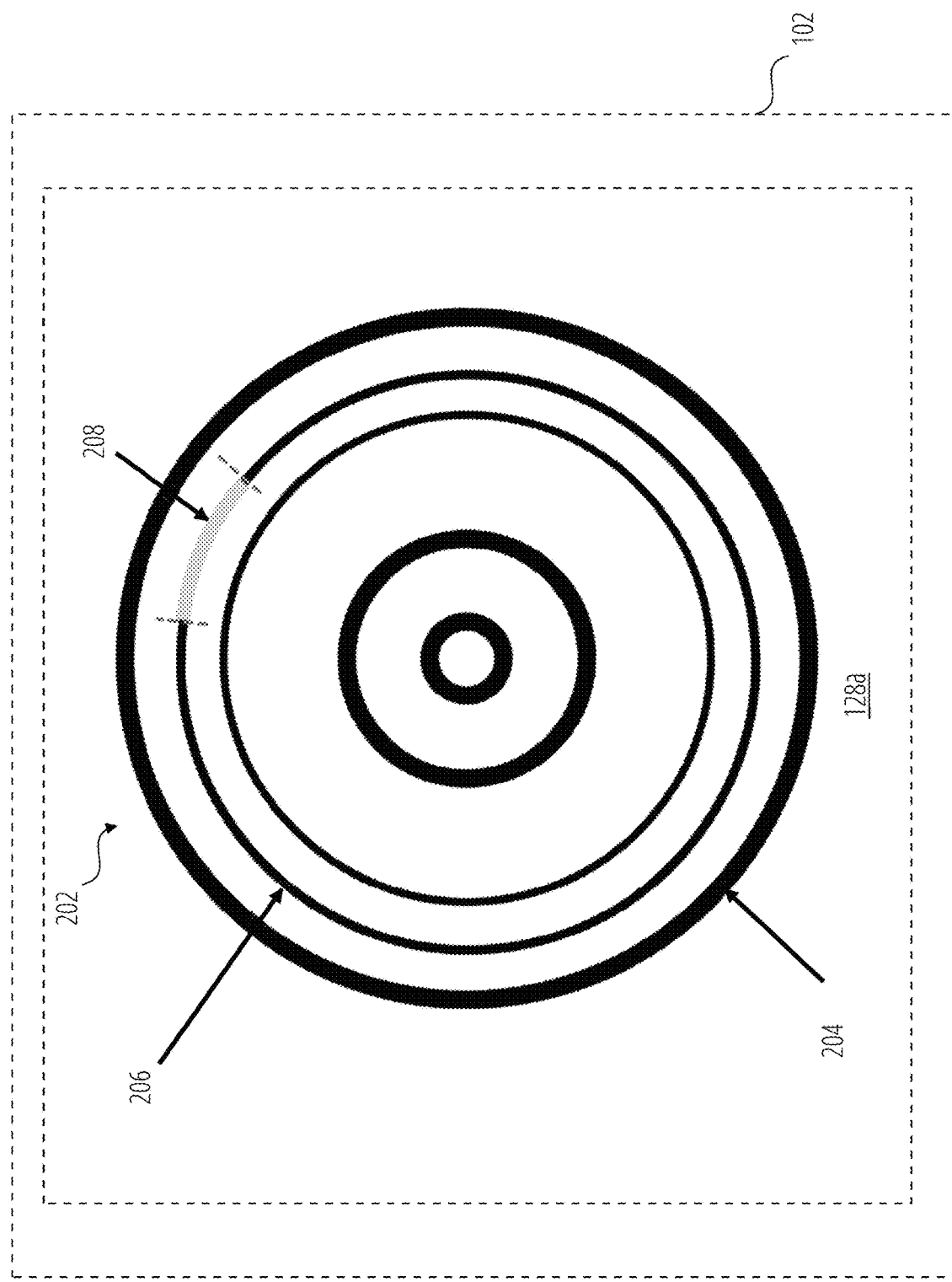
FIG. 2 is a cross-sectional view of a storage device per embodiments of the present disclosure.

Regarding FIG. 2, the storage array 102 can include an EDS 108 that virtualizes the array's storage devices 126. In embodiments, the EDS 108 can provide a host, e.g., client machine 136a, with a virtual storage device (e.g., thin-device (TDEV)) that logically represents one or more of the storage array's memory/storage resources or physical slices/portions thereof. Further, the EDS 108 can provide each TDEV with a unique identifier (ID) like a target ID (TID). Additionally, EDS 108 can map each TID to its corresponding TDEV using a logical unit number (LUN) (e.g., a pointer to the TDEV).

For example, the storage devices 126 can include an HDD 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 108 can provide each slice/portion with a corresponding logical block address (LBA). Additionally, the EDS 108 can group sets of continuous LBAs to establish a virtual storage device (e.g., TDEV). Thus, each TDEV can include LBAs corresponding to one or more of the storage devices 126 or portions thereof.

As stated herein, the storage devices 126 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 108 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 108 can establish the hierarchy to include one or more tiers (e.g., subsets of the array's storage and memory) with similar performance capabilities (e.g., response times and uptimes). Thus, the EDS 108 can establish fast memory and storage tiers to service host-identified critical and valuable data (e.g., Platinum, Diamond, and Gold SLs). In contrast, slow memory and storage tiers can service host-identified non-critical and less valuable data (e.g., Silver and Bronze SLs). Additionally, the EDS 108 can define "fast" and "slow" performance metrics based on relative performance measurements of the array's memory 114 and storage devices 126. Thus, the fast tiers can include memory 114 and storage devices 126 with relative performance capabilities exceeding a first threshold. In contrast, slower tiers can include memory 114 and storage devices 126, with relative performance capabilities falling below a second threshold. In embodiments, the first and second thresholds can have substantially similar values.

Figure 3:
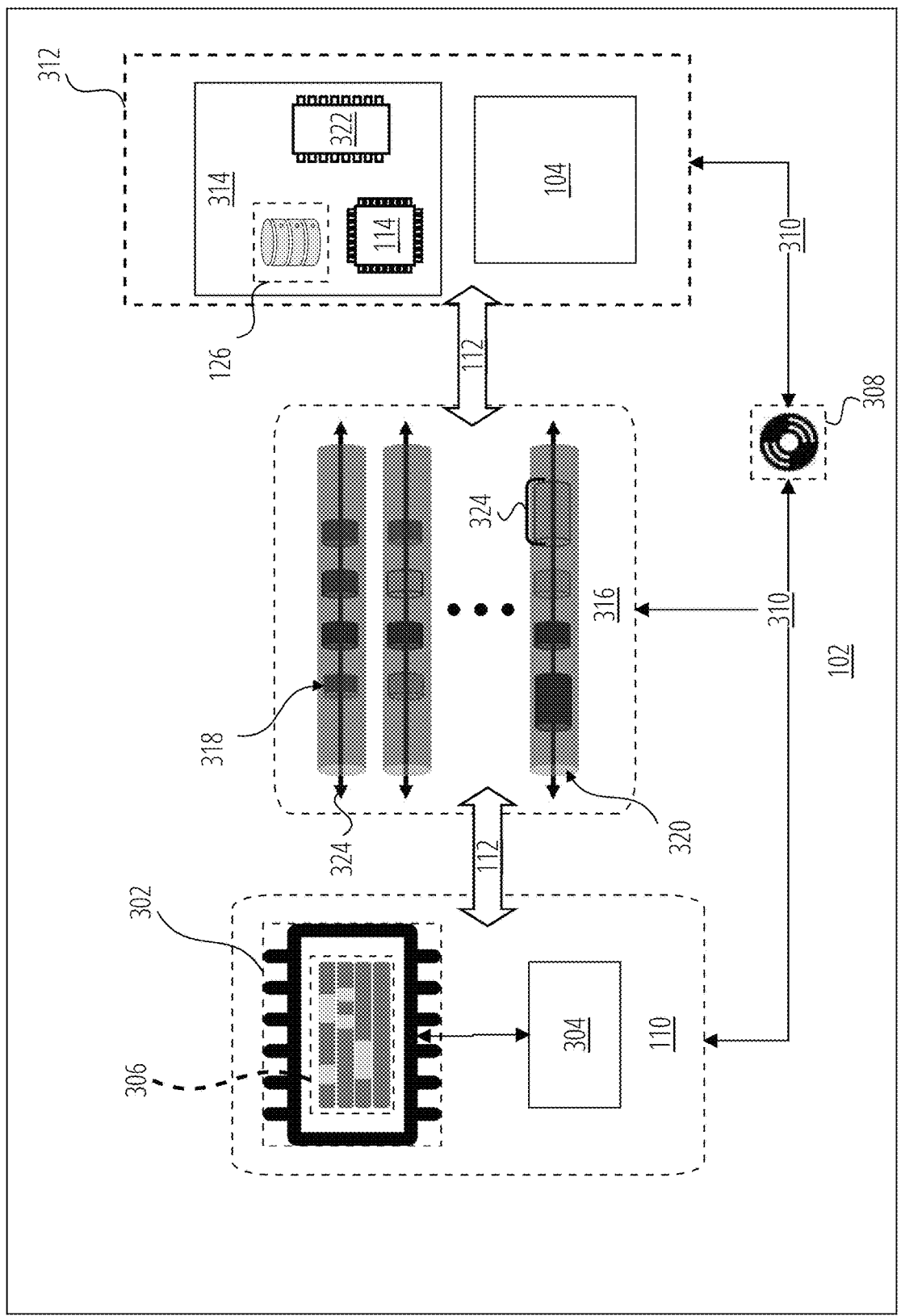
FIG. 3 is a block diagram of a storage array, including a controller per embodiments of the present disclosure.

In embodiments, the EDS 108 can establish logical tracks (e.g., track identifiers (TIDs) by creating LBA groups that include LBAs corresponding to any storage devices 126. For example, the EDS 108 can establish a virtual storage device (e.g., a logical unit number (LUN)) by creating TID groups. Further, the EDS 108 can generate a searchable data structure, mapping logical storage representations to their corresponding physical address spaces. Further, the HA 106 can present the hosts 134 with the logical memory and storage representations based on host or application performance requirements Regarding FIG. 3, the storage array 102 can include a system controller 110 that can manage system resources 312 and threads 316. For example, the controller 110 can include a local memory 302 and hardware, circuitry, and logical controller elements 304 configured to manage the system resources 312 and threads 316. Specifically, the controller 110 can use system-related data 306 stored in its local memory 302 to perform one or more management services. The system-related data 306 can include historical, current, and predicted IO workload-related data, IO request-related data, telemetry-related data, performance-related data, component-related data, resource-related data, activity logs, and activity-related data, system-resource-related data, models, instructions, policies, and the like.

In embodiments, the controller 110 can obtain the system-related data 306 using one or more daemons 308. Specifically, each daemon 308 can establish one or more links 310 (e.g., via communication channels 112 of FIG. 1) with the array's system resources 312 and threads 316. Accordingly, each daemon 308 can use the link 310 to record the system-related data 306 from the system resources 312 and threads 316. Additionally, the system resources 312 can include one or more of the array's components 104 and work-related resources 314. The work-related resources 314 can include one or more of the array's storage devices 126, memory 114, and computing resources (e.g., processor(s) 322).

In embodiments, the daemons 308 can format their respective system-related data collections 306 into one or more activity logs. For example, the activity logs can include timestamped records defining activity-related data such as consumption levels of the system resources 312, virtual device information (e.g., capacity, IO data types, data sizes, etc.), virtual/physical storage and memory slot sizes, performance metric, SL requirements, telemetry data, and the like. Additionally, activity log records of the threads 316 or operations 318 can include information such as the thread's unique ID, type, corresponding operations 318, temporal-related information (e.g., start time, end time, and duration), resource utilization levels, and the like.

Further, the controller 110 can establish daemon reporting schedules that define activity collection periods, reporting windows, data sample size, daemon sampling intervals, and the like. Further, the controller 110 can analyze historical, current, and predicted system-related data 306 to establish one or more workload models. Additionally, as described in greater detail herein, the controller 110 can use the workload models to manage one or more system operations 318, threads 316, and system resources 312.

Figure 4:
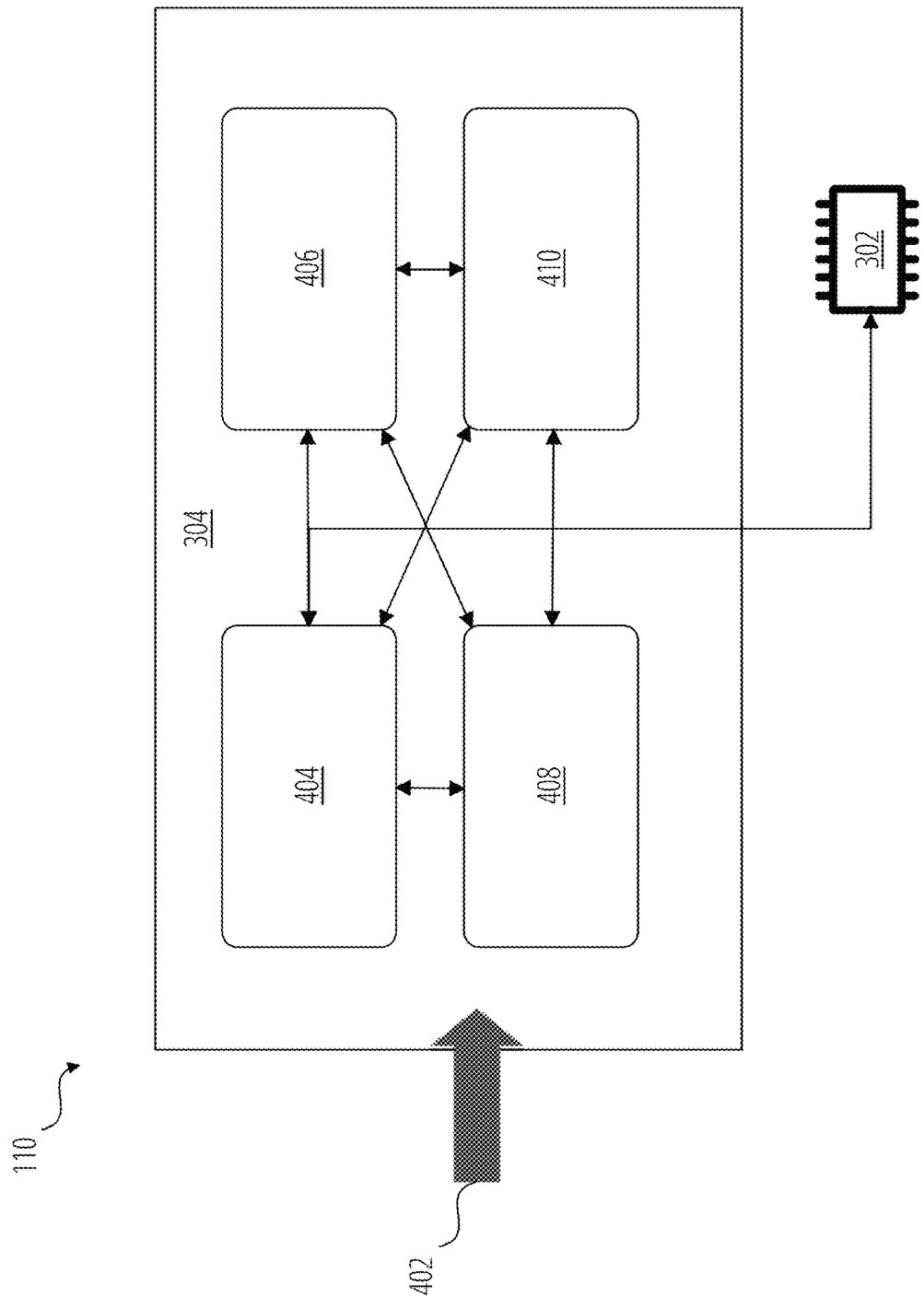
FIG. 4 is a block diagram of a systems controller per embodiments of the present disclosure.

Regarding FIG. 4, a system controller 110 can include hardware, circuitry, and logical controller elements 304 having an architecture designed to perform one or more management services. For example, the controller 110 can perform the management services based on historical, current, and anticipated system workloads 402 (e.g., IO workloads and their corresponding IO requests).

In embodiments, the controller 110 can include a workload analyzer 404 having logic/circuitry that analyzes the system workload 402 and its characteristics. For example, the logic/circuitry can define a self-learning neural network configured to identify patterns corresponding to the system workload 402 and its characteristics. The characteristics can include IO-related metadata, temporal information, SL relationships, type, size, performance metrics, resource requirements, telemetry information, IOs per second (IOPS), load, and growth factors, amongst other related characteristics. Further, the IO-related metadata can include information corresponding to IO sizes, IO types, target LBAs, performance requirements (e.g., response times), payload information, user/host types, user/host profiles, temporal information, and the like.

Using the identified patterns, the workload analyzer 404 can generate a workload model, defining a respective workload's "shape" or "curve," e.g., a graphical representation of the IO load the system workload places on the array 102). For example, the shape can illustrate a system workload's anticipated characteristics (e.g., IO load) during one or more time windows. The time windows can have a duration corresponding to a year, month, week, day, or portions thereof (e.g., morning, afternoon, evening, etc.). In addition, the workload analyzer 404 can further determine the system workload's corresponding load fluctuations (e.g., change rate of the IO load). Further, the workload analyzer 404 can establish a threshold load by measuring the load of one or more points on the workload's "shape." The load can correspond to IOPS, response times, and growth factors, amongst other related performance metrics. For example, the workload analyzer 404 can generate one or more IO load models that define areas on the workload's "shape" corresponding to loads exceeding a first threshold load or loads falling below a second threshold load. The first and second threshold loads can have substantially similar metric values.

In embodiments, the workload analyzer 404 can generate workload models that anticipate system workload characteristics during one or more time windows. For example, a model can anticipate characteristics of a system workload received during a year, month, week, or day. Further, the model can anticipate characteristics of system workloads received during a specific day (e.g., morning, afternoon, evening, etc.). In addition, the workload analyzer 404 can measure IO transmit/receive network-related metrics using transmission and reception IO metadata. Further, the workload analyzer 404 can compare system workload shapes with the network-related metrics to generate the daemon reporting schedules.

In embodiments, the controller 110 can include a sample manager 406 that generates system snapshots defining performance metrics of the system resources 312. Each system snapshot can include performance metrics corresponding to a distinct event collection period defined by the daemon reporting schedules. Further, each snapshot can correspond to a specific performance metric of a plurality of performance metrics. Accordingly, the sample manager 406 can generate a snapshot of each metric in a subject set of performance metrics for each event collection period.

In other embodiments, the sample manager 406 can define a global data collection period defining the boundaries of a data collection window. For example, the global data collection period can correspond to a 2-week time frame defined as a function of the current date/time. The sample manager 406 can also define the global data collection period using the system workload models. Specifically, the sample manager 406 can use each workload model's workload prediction to determine a length of time that is likely to provide statistically relevant amounts of data (e.g., data sample size). For example, the sample manager 406 can determine that a subject data sample size is required to represent any workload the storage array can experience statistically. The sample manager 406 can select the subject data sample size such that any resulting analysis/predictions exceed a minimum confidence threshold (e.g., accuracy) within an error margin threshold. Further, the sample manager 406 can determine an operational duration of the storage array 102 that is likely to provide a data sample size corresponding to relevant data (e.g., subject performance metrics) based on the data sample size and workload predictions.

In embodiments, the sample manager 406 can further segment the global data collection period into several buckets (e.g., sampling windows) using the workload models. The buckets can correspond to dynamic or static temporal durations based on the anticipated workload patterns. For example, the sample manager 406 can establish the buckets corresponding to 4-hour windows (e.g., bucket size). Specifically, the bucket size can correspond to predicted changes in the system workload. Further, the sample manager 406 can establish a data sampling interval used by the daemons 308 to generate activity logs for each bucket. Specifically, the sample manager 406 can determine that it requires n-samples for each bucket to ensure the activity logs do not exclude relevant data. For example, the sample manager 406 can define a 5-second data collection interval for the daemons 308 to generate sufficient activity logs that capture the relevant data.

In embodiments, the sample manager 406 can condense the data sample size of the global data collection period by consolidating data corresponding to recurring time frames within the global data collection period. For example, each week of 2 weeks includes days with corresponding and equivalent time slots (e.g., buckets corresponding to 8 AM-12 PM on a Monday ("subject Monday bucket")).

In embodiments, the sample manager 406 can represent time slots of a calendar week using a data structure (e.g., an array) listing each bucket according to an index value or position. Thus, the Monday buckets for each week of the 2 weeks can correspond to buckets with equivalent index positions (or values). Accordingly, the sample manager 406 can identify buckets corresponding to the same day, time, and performance metric based on each bucket's index and performance type metadata. For each performance metric, the sample manager 406 can consolidate buckets with the same index using one or more data consolidation techniques. For example, the data consolidation technique can include calculating a single weighted average metric value for buckets with matching indices corresponding to the same subject performance metric.

Specifically, the global data collection period can include one or more recurring time frames. For example, a 2-week global data protection period includes buckets for a day during a first week and a corresponding day during a second week (e.g., Monday). Accordingly, the Monday of the first week can include a bucket corresponding to a subject time frame, and the Monday of the second week can also include a bucket corresponding to the same subject time frame. Therefore, the sample manager 406 can further calculate a weighted average value In embodiments, the controller 110 can also include an operations analyzer 408 that includes logic/circuitry configured to analyze activity corresponding to work performed by the storage array 102 and its components 104. The work can include one or more operations 318 or an operation thread 320 that defines several operations 318 executed according to a defined sequence. Further, the operations analyzer 408 can identify the system resources 312 required by the operations 318 and operation threads 320. For example, the operations analyzer 408 can analyze the activity logs generated by the daemons 308 using the unique ID corresponding to each operation 318, operation threads 320, and the device ID of each system resource 312. Further, the operations analyzer 408 can correlate activity timestamps of each operation 318 and operation thread 320 with activity timestamps of each system resource 312 to identify the necessary system resources 312.

In embodiments, the controller 110 can further include a thread controller 410 that can manage and allocate system resources 312 to execute the operations 318 and operation threads 320. For example, the thread controller 410 can provide each operation 318 and operation thread 320 with relative levels of importance. The relative importance levels can be a function of the impact an execution or inactivity of the operations 318 and operation threads 320 have on the storage array's overall performance and functionality. Further, the thread controller 410 can analyze the IO load model stored in memory 302 to determine its defined system workload's "shape." For example, the shape can define the system workload's corresponding temporal characteristics 324 (e.g., start/end times and duration), including locations where loads fall below a subject threshold load (e.g., low IO load segments). Furthermore, as stated herein, the loads can correspond to IO load or load fluctuations of one or more subject array-related performance metrics (e.g., IOPS, response times, growth factors, etc.)

Further, the thread controller 410 can generate one or more job models, defining a schedule for allocating the system resources 312 and executing certain system operations 318 based on certain thread-related data. The thread-related data can include, e.g., the IO load model analysis, workload models, consolidated bucket values for each subject performance metric, and the like. The thread controller 410 can also generate the schedules based on a temporal characteristic correlation between the system workload's low IO load segments, the array's operation threads 320 (and corresponding operations 318). Further, the thread controller 410 can generate the job schedules by comparing the system resources 312 required by operation 318 and operation thread 320 and the system resources 312 available during each system workload's low IO load segments. Accordingly, the controller 110 can execute certain array-related operations and threads to minimize any impact on the array's performance corresponding to processing host-related IO workloads.

The following text includes details of one or more methods or flow diagrams disclosed herein. For context and without limitation, each method is depicted and described as one or more acts. Each act can occur in various orders or concurrently with other acts described herein, or neither presented nor described herein. Furthermore, each act can be optional and, thus, not required to implement each method described herein.

Figure 5:
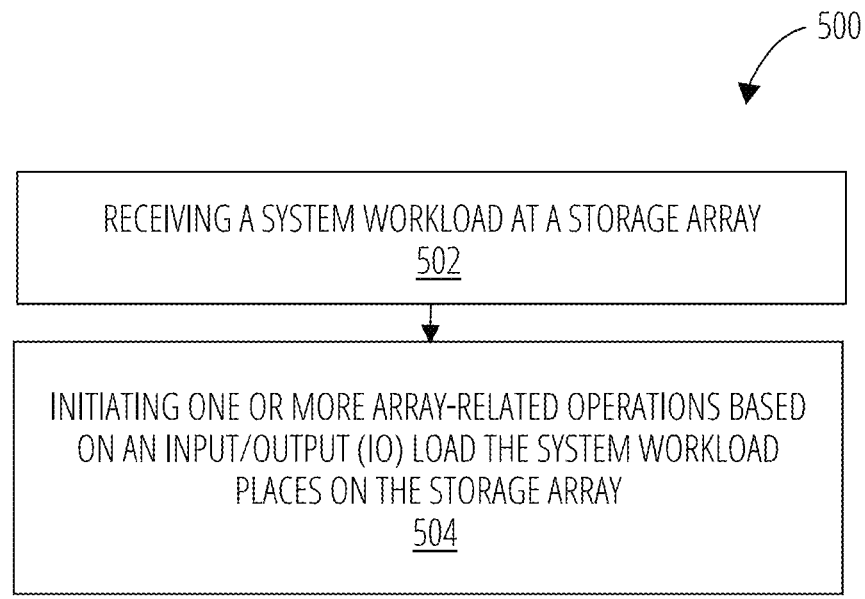
FIG. 5 is a flow diagram of a method for managing system operations per embodiments of the present disclosure.

Regarding FIG. 5, one or more of the array's components 104 can execute a method 500 that includes acts for managing system-related operations. For example, at 502, the method 500 can include receiving an input/output (IO) workload at a storage array. Further, at 504, method 500 can include initiating one or more array-related operations during one or more low IO load points of the system workload. Additionally, each act (e.g., step or routine) of the method 500 can include any combination of the techniques described herein.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special purpose logic circuitry.

A computer having a display device that enables user interaction can implement the above-described techniques such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a backend component can also implement the above-described techniques. The backend component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation, or other graphical user interfaces for a transmitting device. Finally, the system's components can interconnect using any form or medium of digital data communication (e.g., a communication network). Examples of communication network(s) include a local area network (LAN), a wide area network (WAN), the Internet, wired network(s), or wireless network(s).

The system can include a client(s) and server(s). The client and server (e.g., a remote server) can interact through a communication network. For example, a client and server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:
1. A method comprising:
receiving a system workload at a storage array by a system controller;
initiating, by the system controller, one or more array-related operations based on an input/output (IO) load the system workload places on the storage array;
identifying, by the system controller, one or more patterns associated with the system workload and its corresponding IO requests based on network-related metrics and array-related performance metrics;
determining, by the system controller, relative importance levels between the one or more array-related operations, wherein the relative importance levels define the impact of an execution or inactivity of each array-related operation on a performance of the storage array;
preventing, by the system controller, interference between the one or more array-related operations based on the identified one or more patterns associated with the system workload and its corresponding IO requests, wherein preventing the interference includes controlling the allocation of system resources of the storage array for the execution of the one or more array-related operations;

analyzing, by the system controller, the system workload and each of its corresponding input/output (IO) requests;

measuring, by the system controller, the network-related metrics related to receiving the system workload and its corresponding IO requests; and calculating, by the system controller, the array-related performance metrics relating to receiving and processing the system workload and its corresponding IO requests based on the network-related metrics and the system workload analysis.

2. The method of claim 1, further comprising:

generating one or more system workload models based on the system workload analysis, historical, current, and anticipated array-related performance metrics, and historical, current, and anticipated network-related metric measurements.

3. The method of claim 2, further comprising:

determining a system workload shape of the system workload and its corresponding IO requests based on the one or more system workload models.

4. The method of claim 3, further comprising:

defining a global data collection period corresponding to statistically relevant data sets for one or more of the system workload and correspond IO requests analysis, network-related metric measurements, and array-related performance metric calculations; and defining a data collection size based on the global data collection period.

5. The method of claim 4, further comprising:

defining a data collection sampling window based on the global data collection period and the data collection size;

collecting data samples during each data collection sampling window; and segmenting the data samples into buckets based on temporal relationships between one or more of the data samples.

6. The method of claim 5, further comprising:

measuring the storage array's load during one or more points on the system workload shape of the system workload;

determining a load growth factor for each of the one or more points based on at least the array-related performance metrics; and correlating each point's load and load growth factor with each system workload model and system workload shape of the system workload.

7. The method of claim 6, further comprising:

determining a duration and frequency for each array-related operation; and generating one or more IO load models defining periods corresponding to the one or more system workload shape points where the load growth factor exceeds a threshold growth factor or the low IO load points fall below a load threshold.

8. The method of claim 1, further comprising:

generating an array-related operations model defining a schedule for performing the one or more array-related operations based on the one or more IO load models; and initiating the one or more array-related operations based on the array-related operations model.

9. An apparatus including a memory and processor, the apparatus configured to:

receive a system workload at a storage array by a system controller;

initiate, by the system controller, one or more array-related operations based on an input/output (IO) load the system workload places on the storage array;

identify, by the system controller, one or more patterns associated with the system workload and its corresponding IO requests based on network-related metrics and array-related performance metrics;

determine, by the system controller, relative importance levels between the one or more array-related operations, wherein the relative importance levels define the impact of an execution or inactivity of each array-related operation on a performance of the storage array;

prevent, by the system controller, interference between the one or more array-related operations based on the identified one or more patterns associated with the system workload and its corresponding IO requests, wherein preventing the interference includes controlling the allocation of system resources of the storage array for the execution of the one or more array-related operations;

analyze, by the system controller, the system workload and each of its corresponding input/output (IO) requests;

measure, by the system controller, the network-related metrics related to receiving the system workload and its corresponding IO requests; and calculate, by the system controller, the array-related performance metrics relating to receiving and processing the system workload and its corresponding IO requests based on the network-related metrics and the system workload analysis.

10. The apparatus of claim 9, further configured to:

generate one or more system workload models based on the system workload analysis, historical, current, and anticipated array-related performance metrics, and historical, current, and anticipated network-related metric measurements.

11. The apparatus of claim 10, further configured to:

determine a system workload shape of the system workload and its corresponding IO requests based on the one or more system workload models.

12. The apparatus of claim 11, further configured to:

define a global data collection period corresponding to statistically relevant data sets for one or more of the system workload and correspond IO requests analysis, network-related metric measurements, and array-related performance metric calculations; and define a data collection size based on the global data collection period.

13. The apparatus of claim 12, further configured to:

define a data collection sampling window based on the global data collection period and the data collection size;

collect data samples during each data collection sampling window; and segment the data samples into buckets based on temporal relationships between one or more of the data samples.

14. The apparatus of claim 13, further configured to:

measure the storage array's load during one or more points on the system workload shape of the system workload;

determine a load growth factor for each of the one or more points based on at least the array-related performance metrics; and correlate each point's load and load growth factor with each system workload model and system workload shape.

15. The apparatus of claim 14, further configured to:
determine one or more of a duration and frequency for each array-related operation; and
generate one or more IO load models defining periods corresponding to the one or more system workload shape points where the load growth factor exceeds a threshold growth factor or the low 10 load points fall below a load threshold.

16. The apparatus of claim 9, further configured to:
generate an array-related operations model defining a schedule for performing the one or more array-related operations based on the one or more IO load models; and
initiate the one or more array-related operations based on the array-related operations model.

* * * * *